US006637283B2

(12) United States Patent
Belloso (10) Patent No.: US 6,637,283 B2
(45) Date of Patent: Oct. 28, 2003

(54) CONTROL APPARATUS FOR A CONTINUOUSLY VARIABLE TRANSMISSION

(76) Inventor: Gregorio M. Belloso, 5302 Chinaberry Dr., Salisbury, MD (US) 21801

( * ) Notice: Subject to any disclaimer, the term of this patent is extended or adjusted under 35 U.S.C. 154(b) by 0 days.

(21) Appl. No.: 10/045,526

(22) Filed: Jan. 15, 2002

(65) Prior Publication Data

US 2003/0134706 A1 Jul. 17, 2003

(51) Int. Cl.[7] .......................... F16H 3/22; F16H 63/02; F16H 7/22
(52) U.S. Cl. ........................ 74/342; 474/128; 474/11
(58) Field of Search ................................ 474/128, 78, 72, 474/8, 43, 11, 23; 74/342, 335, 355, 333, 358, 329, 373; 475/210, 211, 212

(56) References Cited

U.S. PATENT DOCUMENTS

| 4,990,127 A | * | 2/1991 | Roberts et al. ............. 475/211 |
| 5,910,190 A | * | 6/1999 | Brookins ..................... 74/342 |
| 5,931,760 A | | 8/1999 | Beim et al. |
| 5,961,414 A | | 10/1999 | Beim et al. |
| 5,971,887 A | * | 10/1999 | Hattori et al. ................ 477/41 |
| 6,146,308 A | * | 11/2000 | Taniguchi et al. ............ 477/45 |
| 6,189,412 B1 | * | 2/2001 | Tsubata et al. ............... 474/43 |
| 6,513,402 B1 | * | 2/2003 | Morrow et al. ............... 74/342 |

* cited by examiner

Primary Examiner—Marcus Charles
(74) Attorney, Agent, or Firm—Norman Rainer (57) ABSTRACT

An apparatus for extending the drive ratios and versatility of a continuously variable transmission (CVT) includes an enclosure which houses parallel input and output shafts journaled to front and rear walls of the enclosure. The input shaft receives rotative force directly from one or two CVT units. Low gear, drive gear and reverse gears are disposed upon the input shaft. Corresponding driven low gear, drive gear and reverse gears are disposed upon the output shaft. The corresponding gears are connected by positive drive belts. Coupling devices axially sliding upon splines in the input shaft in response to a shifting lever achieve low, drive, reverse and park modalities of the apparatus.

4 Claims, 11 Drawing Sheets

PRIOR ART

CONTROL APPARATUS FOR A CONTINUOUSLY VARIABLE TRANSMISSION

BACKGROUND OF THE INVENTION

1. Field of the Invention

This invention concerns transmission mechanisms for automotive vehicles, and more particularly relates to a control apparatus for a continuously variable speed ratio transmission.

2. Description of the Prior Art

Continuously variable transmission (CVT) devices employing movable-sheave pulleys with variable pitch diameters are in widespread use in recreational vehicles, golf carts, go-carts, mini-bikes and snowmobiles.

Figure 11A:
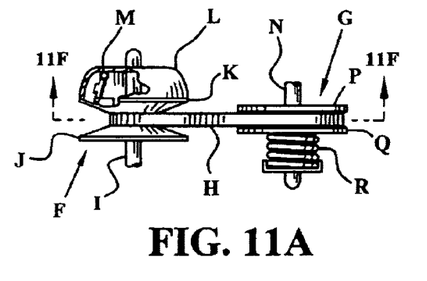
FIG. 11A is a top view of a speed-sensitive CVT at low speed.

The CVT with variable pitch pulleys is described below, and this description will be best understood when read in conjunction with the following drawings in which:

FIG. 11A is a top view of a speed-sensitive CVT at low speed.

Figure 11B:
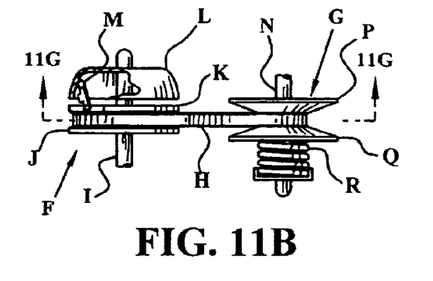
FIG. 11B is a top view of a speed-sensitive CVT at high speed.

FIG. 11B is a top view of a speed-sensitive CVT at high speed.

Figure 11C:
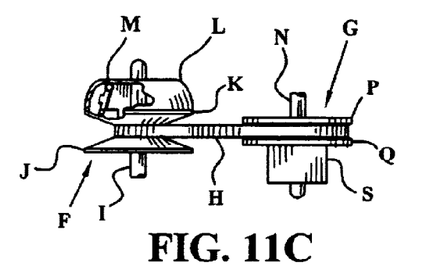
FIG. 11C is a top view of a torque-sensitive type CVT at low speed.

FIG. 11C is a top view of a torque-sensitive type CVT at low speed.

Figure 11D:
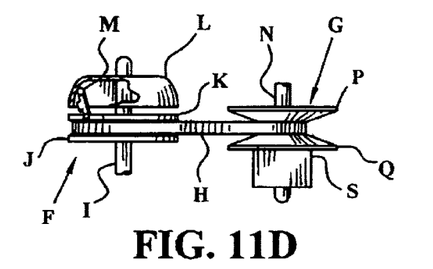
FIG. 11D is a top view of a torque-sensitive type CVT at high speed.

FIG. 11D is a top view of a torque-sensitive type CVT at high speed.

Figure 11E:
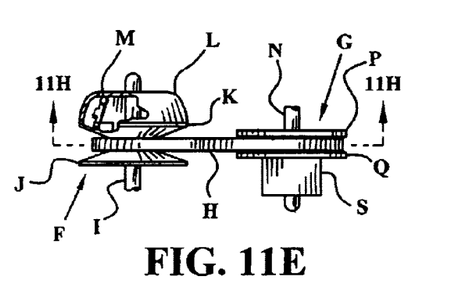
FIG. 11E is a top view of a torque-sensitive type CVT at medium output speed.

FIG. 11E is a top view of a torque-sensitive type CVT at medium output speed.

Figure 11F:
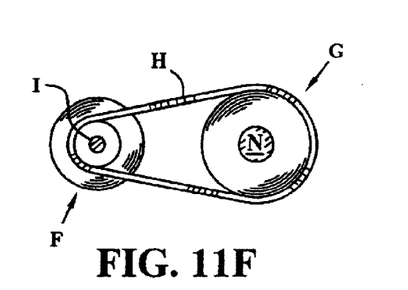
FIG. 11F is a sectional view along line 11F—11F of FIG. 11A.

FIG. 11F is a sectional view along line 11F—11F of FIG. 11A.

Figure 11G:
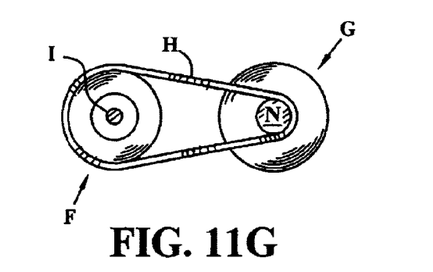
FIG. 11G is a sectional view along line 11G—11G of FIG. 11B.

FIG. 11G is a sectional view along line 11G—11G of FIG. 11.

Figure 11H:
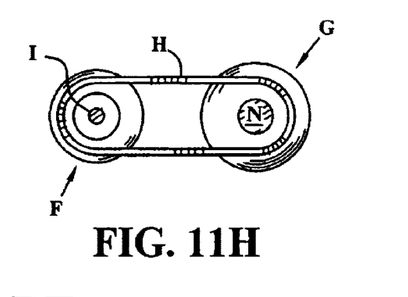
FIG. 11H is a sectional view along line 11H—11H of FIG. 11E.

FIG. 11H is a sectional view along line Z–Z' of FIG. 11E.

Referring now to the above drawings wherein similar letters refer to similar parts, there is shown a driver pulley F and a driven pulley G interconnected by a "V" type belt H. Driver pulley F is fixedly mounted on the engine output shaft I, and is comprised of stationary sheave J and axially movable sheave K. Associated with sheave K is a bowl-shaped ramp plate L which houses centrifugally actuated roller weights M. When the engine speed increases, the roller weights M follow the contour of ramp plate L and force movable sheave K toward stationary sheave J. Such action moves V-belt H toward the outer circumference of drive pulley F, further causing the belt to pull against driven pulley G.

Driven pulley G is fixedly mounted on output shaft N, and has a stationary sheave P and axially movable sheave Q. The movable sheave Q is normally constantly pressed against the stationary sheave P by the action of a spring R and/or a cam actuator S. When equipped with spring R, pulley G is speed sensitive. When equipped with cam actuator S, pulley G is torque sensitive.

When the engine is at "idle", or running below a preset "engagement speed", the movable sheave K of driver pulley F rests at its farthest point from stationary sheave J, and does not apply pressure on the belt. In such condition, no power is transmitted to driven pulley G, and the system remains disengaged, namely at "neutral". As the engine speed increases beyond the "engagement speed", the centrifugally actuated roller weights M follow the inner contour of bowl-shaped ramp plate L, forcing movable sheave K towards stationary sheave J, thereby exerting axial displacement force against the belt. Initially, as the belt is engaged, it rides close to the center of driver pulley F and it also rides at the outer edge of driven pulley G, as shown in FIG. 11A. The driver pulley F, therefore, carries the belt at a smaller pitch diameter while the driven pulley G carries the belt at a correspondingly larger pitch diameter by virtue of the action of the driven pulley spring R and/or cam actuator S. This creates a "low gear" ratio condition.

As the rotational speed of output shaft I increases, roller weights M move further centrifugally on ramp plate L, forcing movable sheave K against belt H which is then forced farther toward the outer edge of driver pulley F. This causes the belt to force itself deeper into the inner portion of drive pulley G as it forces driven pulley movable sheave Q farther from driven pulley stationary sheave P and compresses spring R. This creates a "high gear" ratio condition, as shown in FIG. 11B If the driven pulley G is equipped with a cam actuator S, when increased load occurs (such as on climbing a hill) after the vehicle is up to speed, the cam actuator takes over and automatically "downshift" without loss of engine speed, as shown in FIG. 11E.

It is accordingly seen that the CVT mechanism is infinitely variable between the low gear position shown in FIGS. 11A and 11C and high gear positions shown in FIGS. 11B and 11D. Furthermore, the torque-sensitive type system automatically and continuously adjusts for variations in load as well.

The CVT automatic transmission is relatively inexpensive, and has found wide application in recreational vehicles, snowmobiles, lawn mowers, go-karts, golf carts, and similar vehicles. However, its use in automotive vehicles has been limited by its relatively narrow range of speed reduction ratios generally no greater than from 3:1 for "low" through 1:0.81 for "high". This has not been adequate for cars and trucks, which require not only greater low speed torque for satisfactory acceleration, but also much higher top speeds for highway travel. Furthermore, the CVT mechanism does not readily accommodate reverse motion and parking brake functionality.

Efforts to extend the operational range of the CVT have been varied, most being through the addition of complex and expensive machinery which tends to nullify any cost advantage over conventional automatic transmissions which use hydraulic torque converters. Typical prior efforts are described in the following patent references.

U.S. Pat. No. 5,971,887 discloses infinitely variable ratio pulleys similar to the CVT described above and adds a planetary gear system associated with the output shaft, complete with the necessary hydraulic pumps, valves, pump and valve control means, brakes and clutches required for the proper functioning of a planetary gear system, to increase the range of operational speed ratios. Furthermore, instead of having a centrifugally actuated driver pulley and spring or cam actuated driven pulley, this invention uses a hydraulic system with associated sensors and control means to actuate the movable sheaves of both pulleys. These features make this transmission too complex and expensive for use in inexpensive light weight vehicles.

U.S. Pat. No. 5,931,760 describes a dual mode CVT having two sets of hydraulically controlled planetary reduction gears to extend the operating range of the system. Additionally, it places a bladed hydrokinetic torque converter unit between the engine and the planetary gearing to provide further torque multiplication for accelerating the vehicle from rest. It also provides means for bypassing the CVT altogether when large starting torque is needed. Again, this system is too complex and expensive for light inexpensive vehicles.

U.S. Pat. No. 5,961,414 describes a dual mode CVT with multiple torque input paths and at least two planetary gearsets, one for reverse and the other(s) for forward drive. Two fixed ratio drive mechanisms provide additional torque pathways with the necessary actuating and control mechanism for coordinating the functioning of the multiple torque input paths.

U.S. Pat. No. 4,990,127 describes a dual range CVT having an added fixed ratio speed mechanism to provide a second power path from the input to output shafts. Two planetary gearsets are employed to extend the torque reduction range of transmission. Multiple plate clutches and a hydraulic system are employed to operate the planetary gear system and move the flanges of the pulleys, with the help of sensors and associated control mechanisms.

U.S. Pat. No. 6,146,308 discloses a transmission having a CVT plus a planetary gear mechanism to extend the operational speed range of the system. Such transmission, as previously stated is expensive because of the necessary system of hydraulic pumps, valves, oil pressure chambers, and associated sensing and control features. Furthermore, the means for applying axial forces to the movable sheaves of the driver and driven pulleys is in the form of oil pressure chambers operated and regulated by hydraulic pumps and valves. This adds even more complexity and cost to the transmission.

U.S. Pat. No. 6,189,412 discloses a CVT wherein the movable sheaves of both the primary and secondary pulleys are hydraulically actuated and controlled. The speed reduction system employs two planetary gear sets, also controlled by hydraulic actuators, clutches, pumps and valves.

It is seen from the above review of the prior art that efforts to extend the range of the transmission drive ratio of the CVT have focused on the addition of planetary reduction gearsets and various other modifications. Such additions substantially increase the complexity and the cost of the transmission, causing it to be impractical for light inexpensive fuel-efficient vehicles.

It is accordingly a primary object of the present invention to provide a modified CVT having an extended range of drive ratios suitable for use in automotive vehicles.

It is a further object of this invention to provide a modified CVT as in the foregoing object having improved mechanical efficiency.

It is another object of the present invention to provide a modified CVT of the aforesaid nature having the added features of reverse motion and parking functionality.

It is a still further object of this invention to provide a modified CVT of the aforesaid nature which is amenable to low cost manufacture and easy maintenance.

It is yet another object of the present invention to provide a modified CVT of the aforesaid nature which can accommodate two different power input sources.

These objects and other objects and advantages of the invention will be apparent from the following description.

SUMMARY OF THE INVENTION

The above and other beneficial objects and advantages are accomplished in accordance with the present invention by a control apparatus for a vehicle-mounted CVT having a primary output shaft, said control apparatus comprised of:
  a) an enclosure comprised of front, rear and top walls bounded by interior and exterior surfaces,
  b) an input shaft of circular cylindrical surface contour adapted to engage said primary output shaft as an axial extension thereof and rotatively journaled to said front and rear walls,
  c) low gear and drive gear drive sprocket wheels mounted upon said input shaft in freely rotatable manner and in axially spaced apart relationship, each having, respectively, first and second circular arrays of coupling lobes surrounding said input shaft and axially directed toward said rear wall,
  d) axially aligned splines disposed within the surface of said input shaft,
  e) a first gear coupler mounted upon said input shaft so as to be rotatively driven thereby and interactive with said splines so as to be axially slidable upon said shaft, and provided with a third circular array of axially directed coupling lobes adapted to engage said first array of lobes,
  f) a second gear coupler mounted upon said input shaft so as to be rotatively driven thereby and interactive with said splines so as to be axially slidable upon said shaft, and provided with opposed fourth and fifth circular arrays of axially directed coupling lobes, said fourth array adapted to engage the lobes of said second array,
  g) a sixth circular array of coupling lobes fixedly associated with said rear wall and adapted to engage the lobes of said fifth array, thereby preventing rotative movement of said input shaft and creating a parking status of said vehicle,
  h) shifting means for sliding said first and second gear couplers along said input shaft,
  i) a secondary output shaft journaled to said front and rear walls below said input shaft, and parallel thereto,
  j) low gear and drive gear driven sprocket wheels fixedly mounted upon said secondary output shaft, and interactive with said low gear and drive gear drive sprocket wheels by way of positive drive means such as gearing chains, said low gear driven sprocket wheel being of greater diameter than the corresponding low gear drive sprocket wheel, and said drive gear driven sprocket wheel being of substantially equal diameter with the corresponding drive gear drive sprocket wheel,
  k) a driven spur gear fixedly mounted upon said secondary output shaft adjacent said rear wall and interactive with a drive spur gear carried by said second gear coupler, said interaction causing said secondary output shaft to rotate oppositely to said output shaft, whereby,
  l) shifting movement of said first and second gear couplers produce low speed, high speed or reverse rotational movement of said secondary output shaft, or locked securement thereof.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Referring now to FIGS. 1–10 wherein one character designates one part of the invention, there is shown housing 1 having front wall 2, rear wall 3, top wall 4, and bottom wall 5. A CVT unit is shown comprised of driving pulley 6 mounted on an engine output shaft 7 and connected to driven pulley 8 by V-belt 9. Pulley 8 is mounted on primary output shaft 95. Input shaft 10 is shown as a continuous integral extension of shaft 95, and is rotatably journaled to housing front and rear walls by way of shaft bearings 11. Rotatably mounted on input shaft 10 are low gear primary sprocket wheel 12 and drive gear primary sprocket wheel 13, both mounted on bearings.

The part of input shaft 10 that lies between the low gear sprocket wheel 12 and the drive gear sprocket wheel 13, has a longitudinally splined surface 96. A low gear coupler 14 is mounted on said splined surface. The internal surface of coupler 14 is splined to mate with splined surface 96, whereby, as the input shaft 10 rotates on its bearings 11, coupler 14 rotates with it. The coupler 14 is slidable forward and rearward on input shaft 10 upon splined surface 96.

The front part of coupler 14 is equipped with a third circular array of coupling lobes 15 configured to mesh with a first array of coupling lobes 16 disposed on the rear surface of low gear sprocket wheel 12, thereby forming a releasable coupling. When coupler 14 is moved all the way forward to achieve engagement of coupling arrays 15 and 16, low gear sprocket wheel 12 and coupler 14 will rotate as a unit with input shaft 10. When coupler 14 is moved rearward to disengage coupling arrays 15 and 16, low gear sprocket wheel 12 becomes free to rotate on its bearings independently of the rotation of the input shaft 10.

Forward and rearward movement of coupler 14 is controlled through front shifting fork 17 which is seated in a circular groove on coupler 14. Front shifting fork 17 is secured to front collar 18 mounted on left shifting rod 19 upon which it slides forwardly and rearwardly.

Second or reverse sliding gear-coupler 20 is slidably mounted on input shaft 10 rearwardly of drive gear drive sprocket wheel 13. The external surface of input shaft 10 and the internal surface of reverse sliding gear-coupler 20 are splined to mate with each other so that, as input shaft 10 rotates, reverse sliding gear-coupler 20 is made to rotate as well, and said reverse sliding gear-coupler 20 is slidable forward and rearward on input shaft 10.

The front end of reverse sliding gear-coupler 20 has a fourth circular array of coupling lobes 21 configured to mate with said second array of coupling lobes 22, thereby forming a releasable coupling. When reverse sliding gear-coupler 20 is moved to the extreme forward position so that said second and fourth coupling arrays are fully engaged, drive sprocket wheel 13 and reverse sliding gear-coupler 20 rotate with the input shaft 10 as a unit. When reverse sliding gear-coupler 20 is moved rearwardly, causing disengagement of said second and fourth coupling arrays, drive sprocket wheel 13 is again free to rotate on its bearings independently of the rotation of input shaft 10.

The rear end of reverse sliding gear-coupler 20 has a fifth array of coupling lobes 23 designed to mate with a sixth set of coupling lobes 24 fixedly mounted on the inner surface of rear wall 3 of transmission casing 1, thereby forming a releasable coupling. When reverse sliding gear-coupler 20 is moved to the extreme rearward position so that said fifth and sixth coupling arrays are engaged, reverse sliding gear-coupler 20 and input shaft 10 are completely immobilized. This represents the parking position. Mobility is regained when the reverse sliding gear-coupler 20 is moved forward enough to cause disengagement of said fifth and sixth coupling arrays.

Forward and rearward movement of reverse sliding gear-coupler 20 is controlled through rear shifting fork 25 which is seated within a circular groove on reverse sliding gear-coupler 20. Rear shifting fork 25 is secured to rear collar 26 slidably mounted on first shifting rod 27 secured to said front and rear walls.

A suitable distance below, and parallel to input shaft 10 is secondary output shaft 28 rotatably journaled to said front and rear walls by way of bearings 29. Fixedly mounted on secondary output shaft 28 are low gear driven sprocket wheel 30, drive gear driven sprocket wheel 31, and driven reverse gear 32.

Low gear driven sprocket 30 is connected to low gear drive sprocket 12 by a positive engagement endless compliant member such as gearing chain or belt 33 indexed to engage a sprocket wheel. Accordingly, rotation of low gear drive sprocket 12 will cause low gear driven sprocket 30 to rotate as well. Low gear driven sprocket 30 has greater diameter than low gear drive sprocket 12, whereby rotation of low gear driven sprocket 30 will be slower than that of low gear drive sprocket 12, but will have more torque.

Drive gear driven sprocket 31 is connected to drive sprocket 13 by gearing chain 34 so that rotation of drive sprocket 13 is transmitted to driven sprocket 31. Their diameters are substantially equal, causing them to rotate with equal speed and torque.

Reverse driven gear 32 is positioned so that its gear teeth will mesh with the gear teeth of reverse sliding gear-coupler 20 when the latter is moved rearward to a point just before coupling lobe arrays 23 and 24 begin to mesh with each other. In this position, rotation of reverse sliding gear-coupler 20 results in rotation of reverse driven gear 32 in the opposite direction. Furthermore, the gear-teeth of both the reverse driven gear 32 and the reverse sliding gear-coupler 20 are made sufficiently wide so that when said reverse sliding gear-coupler is further moved to its extreme rearward position so that coupling lobe arrays 23 and 24 become fully engaged, the gear teeth of reverse driven gear 32 and reverse sliding gear-coupler 20 are still partially meshed with each other. In this position, therefore, not only is the reverse sliding gear-coupler 20 immobilized, but the reverse driven gear 32 and output shaft 28 are immobilized as well. This happens when the transmission is set in the "park" position.

Rear sliding collar 26 has a notch 35, and front sliding collar 18 has a notch 36 as well. Notches 35 and 36 are designed to alternately engage the lower end of shift lever 37 which pivots on fulcrum 38 located in an opening through upper wall 4 of housing 1. Shift lever 37 extends through fulcrum 38 thence through shift gate 39 which is an opening on the top surface of cover plate 40. Shift gate 39 is in the form of a small letter "h" with the limbs directed fore and aft. In accord with standard practice, shift positions are marked on the shift gate 39 as follows: "P" for PARK, "R" for REVERSE, "N" for NEUTRAL, "D" for DRIVE, and "L" for LOW, as shown.

Figure 3:
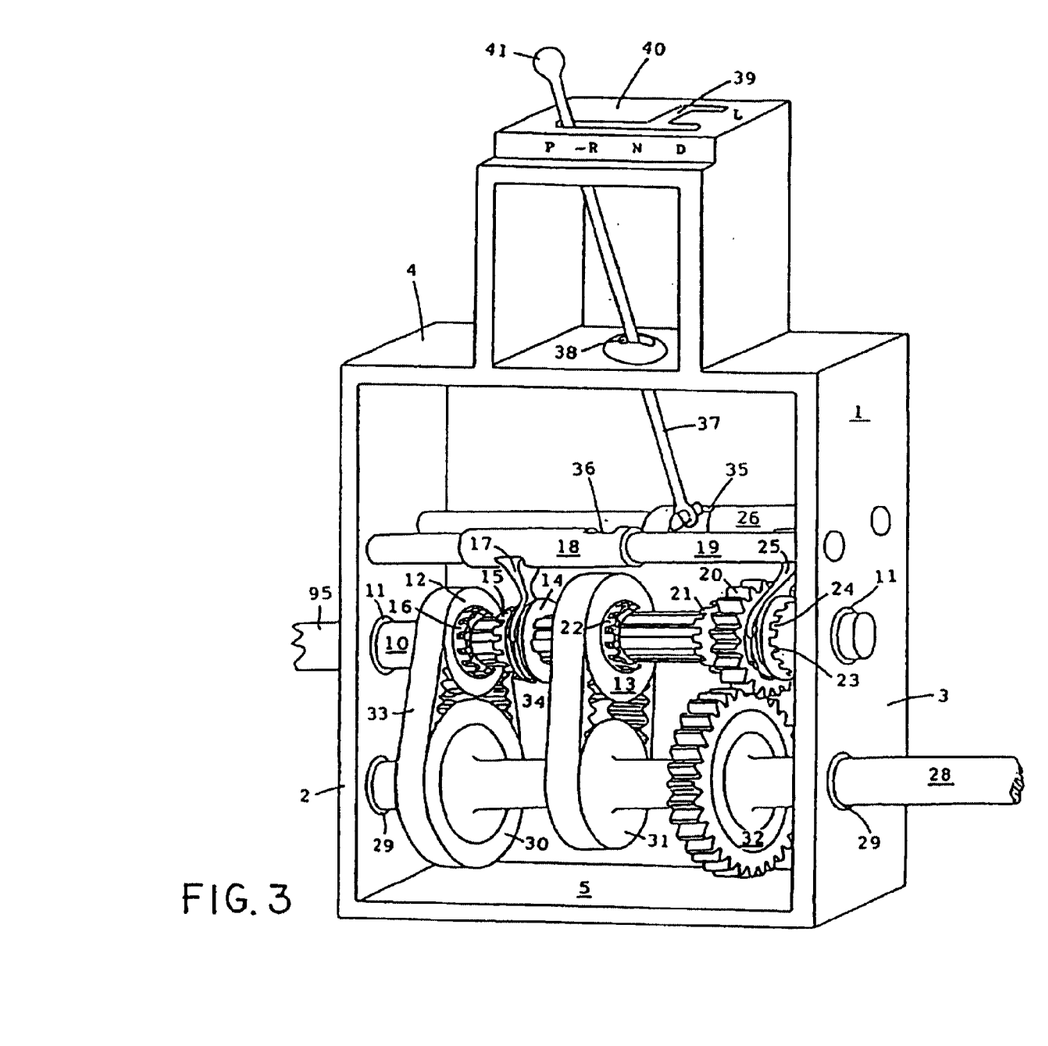
FIG. 3 is the same view with the component parts at "park."
Figure 4:
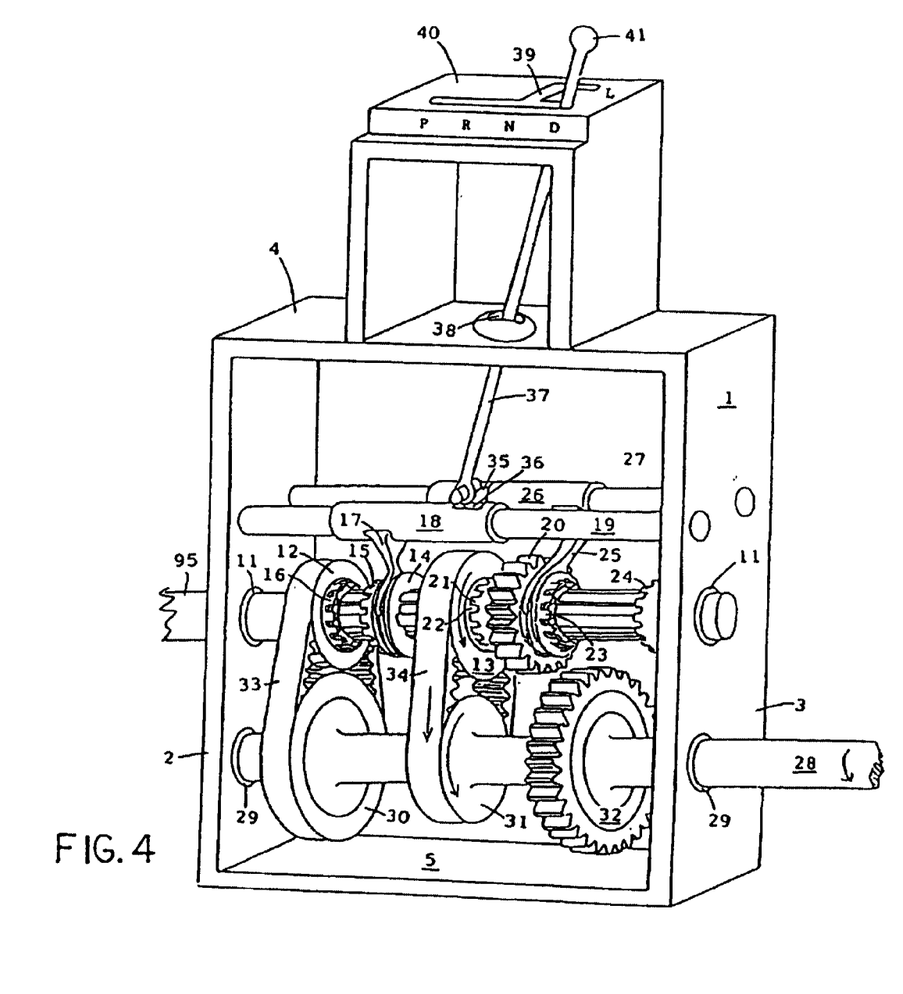
FIG. 4 is the same view with the transmission at "drive."

To put the vehicle in "park" shift lever handle 41 is pushed all the way forward to the point marked "P." This causes shift lever 37 to engage sliding collar 26 through notch 35 and push it to its extreme rearward position, causing rear shifting fork 25 to move reverse sliding gear-coupler 20 to its extreme rearward position, causing its gear teeth to mesh with the gear teeth of reverse driven gear 32. At the same time, coupling lobe array 23 fully engages coupling lobe array 24, As previously explained, such configuration fully immobilizes the output shaft 28, hence the driving wheel(s) of the vehicle are locked in place to keep the parked vehicle from rolling away.

To shift to "reverse," shift lever handle 41 is moved rearward to "R," causing shift lever 37 to move sliding collar 26 partially forward on shifting rod 27. This causes shifting fork 25 to move reverse sliding gear-coupler 20 forward sufficiently to disengage coupling lobe array 23 from coupling lobe array 24, and yet remain fully engaged with reverse driven gear 32. Rotation of primary output shaft 95 in the direction of arrow 42 shown in FIG. 2 therefore results in rotation of reverse driven gear 32 and secondary output shaft 28 in the opposite direction, as shown by arrow 43 in FIG. 2.

Figure 1:
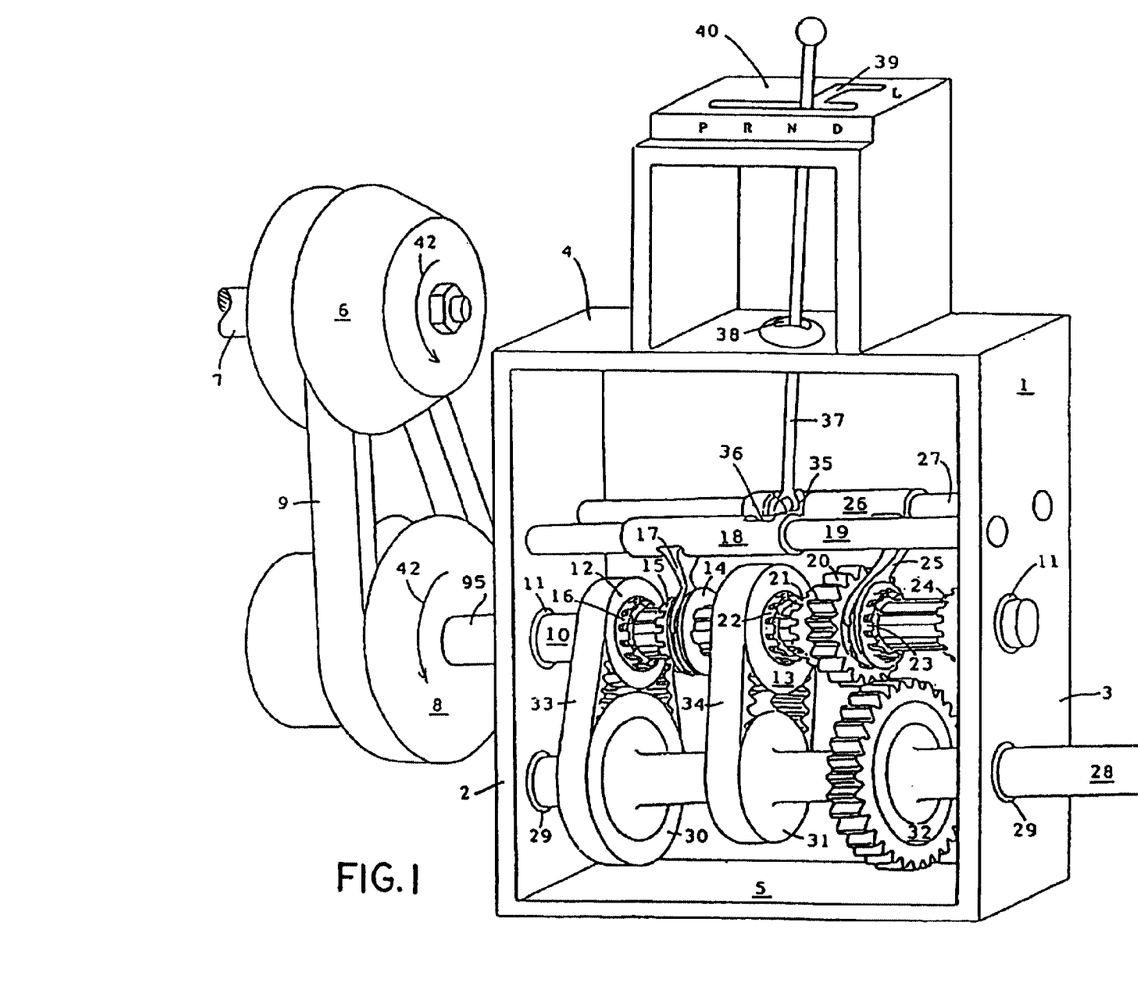
FIG. 1 is a perspective side view of an embodiment of the control apparatus of the invention shown in operative association with a conventional CVT, and shown in a functionally "neutral" positioning of component parts.
Figure 2:
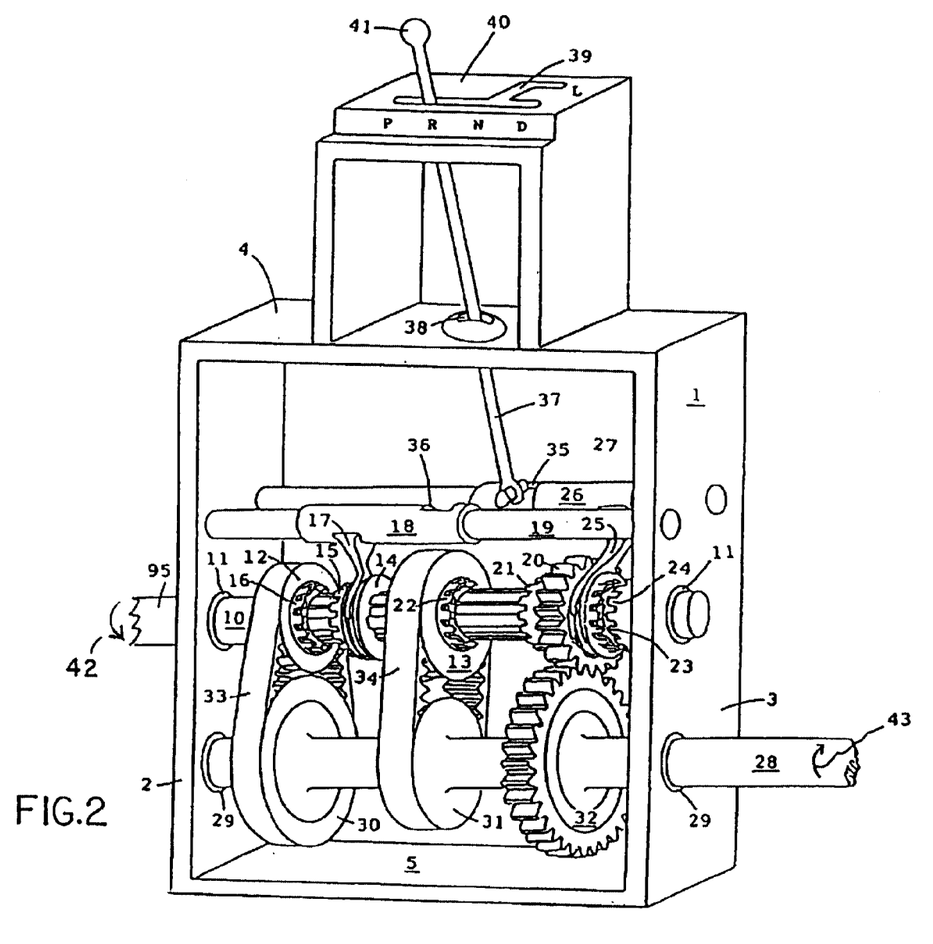
FIG. 2 is the same view with the component parts set at "reverse."

To shift to "neutral," shift lever handle 41 is moved further rearward to the point marked "N" which causes shift lever 37 to move sliding collar 26 and rear shifting fork 25 forward and thus move sliding gear-coupler 20 forwardly sufficiently to disengage it from reverse driven gear 32, yet not sufficiently forward to contact driving gear 13. In this position, as shown in FIG. 1, reverse sliding gear-coupler 20 and input shaft 10 are free to 20 rotate.

To shift to "drive," shift lever handle 41 is moved rearward to "D" which causes shift lever 37 to move sliding collar 26 and rear shifting fork 25 forward, causing reverse sliding gear-coupler 20 to move to its extreme forward position to fully engage coupling lobe arrays 21 and 22. Rotation of input shaft 10 and reverse sliding gear-coupler 20 therefore causes drive sprocket wheel 13 to rotate as well, and, through gearing chain 34, translate this motion into rotation of driven drive sprocket wheel 31 and output shaft 28, in the same direction as shown by the arrows in FIG. 4.

Figure 5:
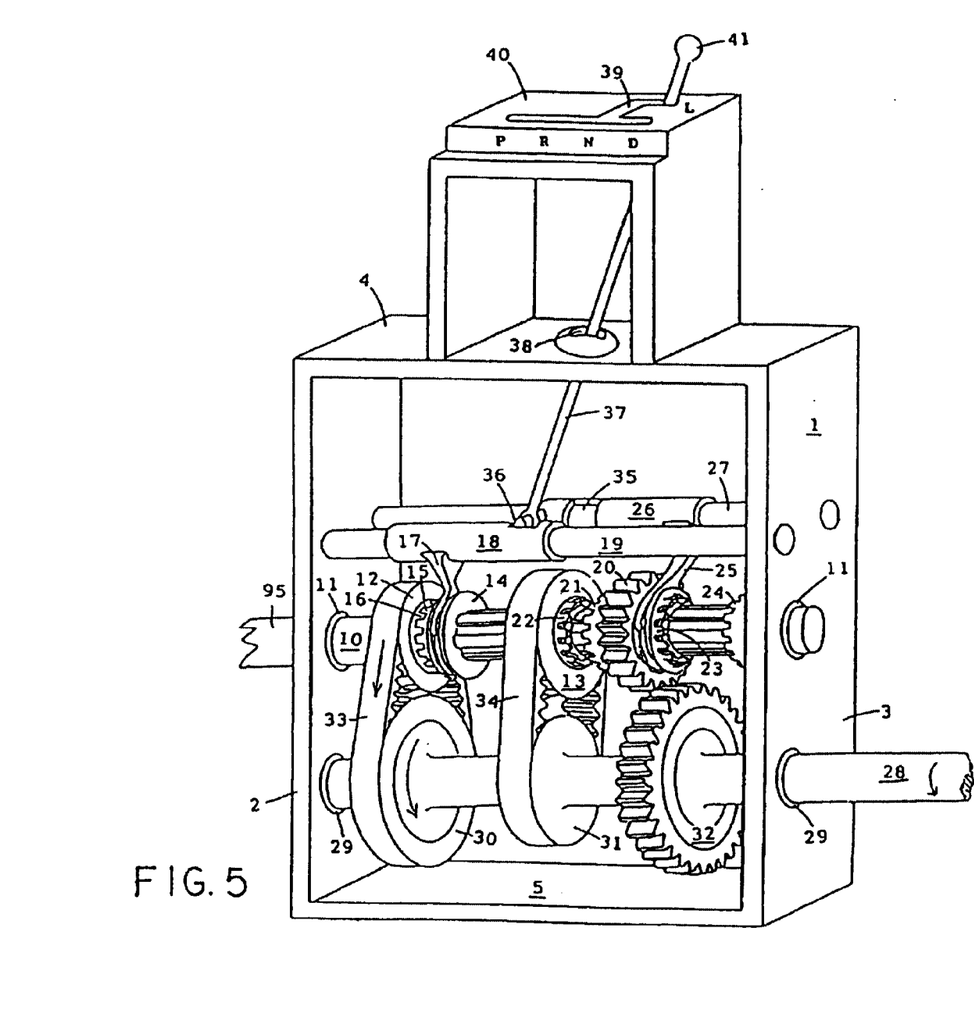
FIG. 5 is the same view with the transmission at "low."
Figure 6:
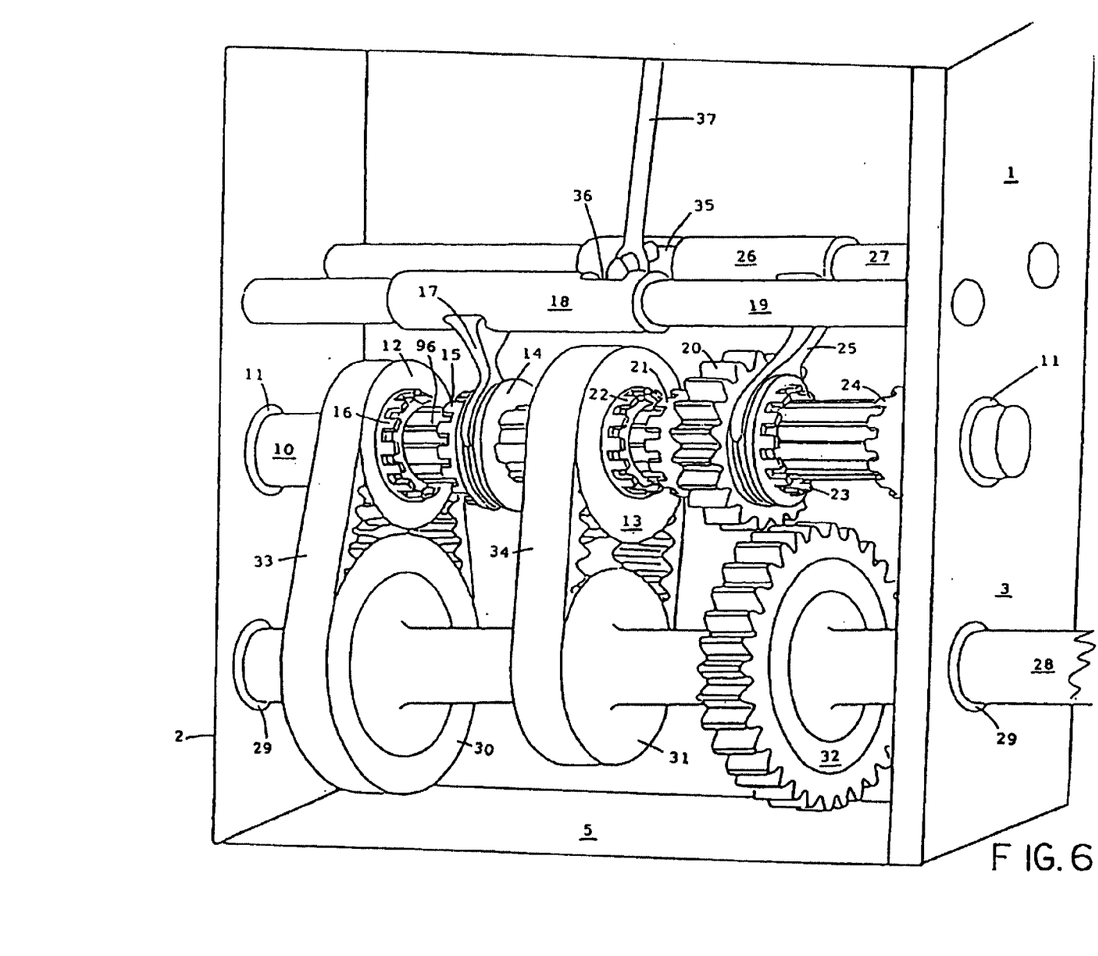
FIG. 6 is a magnified view of the internal parts of the transmission, set at "neutral," to show greater detail.

To shift to "low," shift lever handle 41 is first shifted back to "neutral," disengaging coupling lobe array 21 from coupling lobe array 22. Shift lever handle 41 is then moved to the right, causing the lower end of shift lever 37 to be disengaged from notch 35 of rear sliding collar 26 and to engage notch 36 of front sliding collar 18. Shift lever handle 41 is then moved rearward to the point marked "L" which causes shift lever 37 to move front sliding collar 18 and front shifting fork 17 forward. This causes sliding coupler 14 to be moved to its extreme forward position, thereby causing coupling lobe arrays 15 and 16 to be fully engaged. Rotation of input shaft 10 and sliding coupler 14 is therefore translated into a similar rotation of low gear drive sprocket wheel 12, and, through gearing chain 33, to a similar rotation of low gear driven sprocket wheel 30 and secondary output shaft 28 as well.

The control apparatus of this invention allows for shifting from one speed range to another while the vehicle is in motion. This is done by first easing up on the gas pedal, then shifting to neutral before shifting to the desired speed range. Standard synchronizer rings of suitable design (not shown) facilitate shifting "on the fly."

Figure 7:
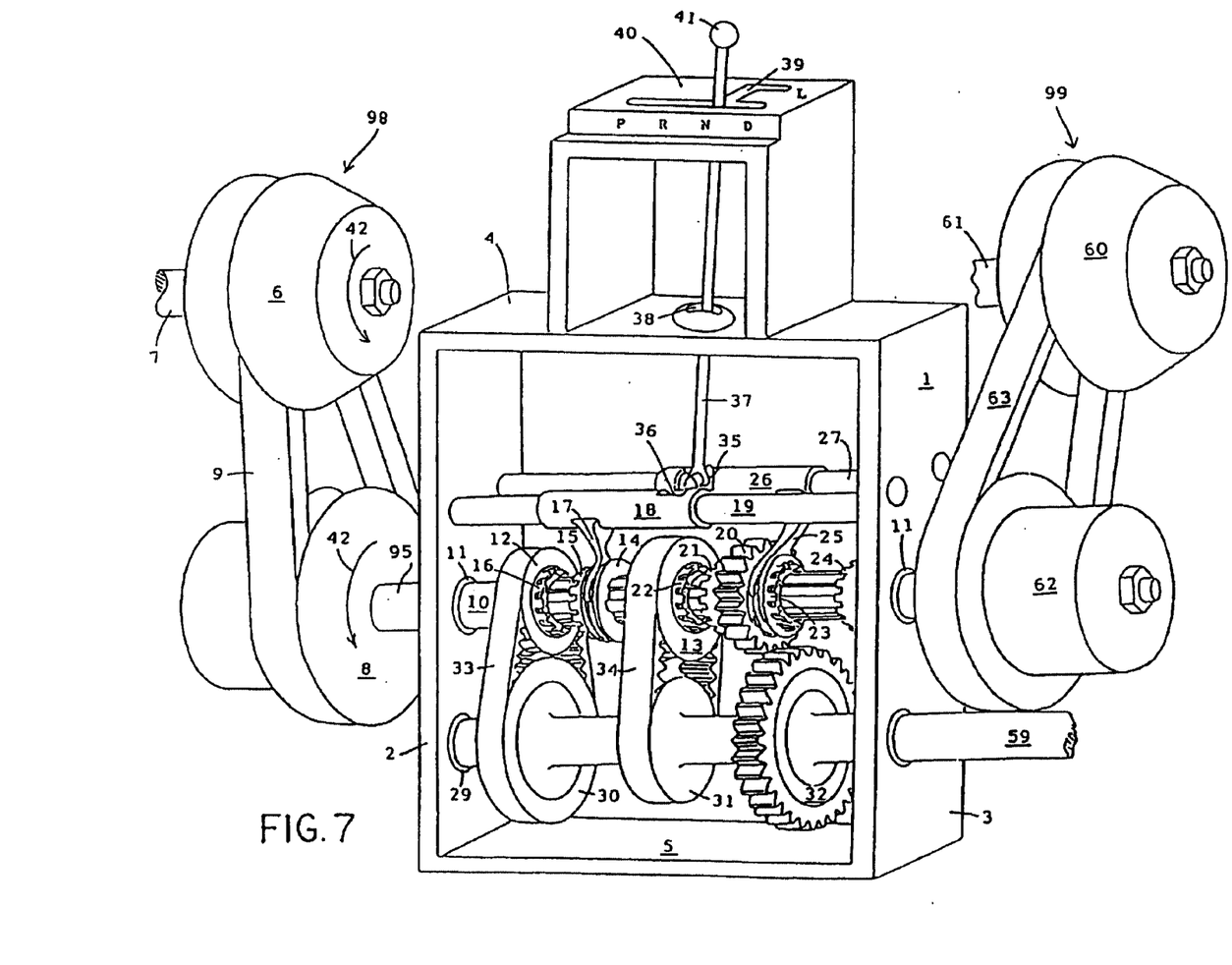
FIG. 7 is the same embodiment shown in FIG. 6, but equipped with two CVT units as means for receiving power from separate primary and secondary engines which may then be operated either simultaneously for faster acceleration and greater climbing power, or one at a time for greater fuel economy.

FIG. 7 shows the same control apparatus shown in FIGS. 1–6 but modified by adding a second CVT comprised of driving pulley 60 mounted on the primary output shaft 61 of a second power source (e.g. a second engine), a driven pulley 62 mounted on a rear extension of input shaft 10, and belt 63 connecting the two pulleys. This arrangement results in a versatile transmission system capable of delivering power from two separate power sources and of making continuous automatic adjustment for any difference in the speed and power output of each.

To illustrate this, FIG. 7 shows a first CVT 98 associated with the forward extremity of input shaft 10, and second CVT 99 associated with the rear extremity of said input shaft. Either the first or second CVT will deliver power to the control apparatus of this invention when the RPM of shaft 7 or 61 exceeds a predetermined speed. If both engines run above such engagement speed, they will automatically share the load, each according to its power output, each running at its own speed, but with the final output shaft 59 speed determined by the speed of the vehicle as powered by the total combined power from the two engines. Necessarily, the faster turning engine will be slowed down by the load while the "slower" engine will be carrying a lighter load and is then able to turn faster to match the speed of the other engine. All of these adjustments are done automatically by their respective CVT's. The moment one engine runs below the engagement speed it will be simply automatically "disengaged" from the load, and will in effect be running at idle. This feature is especially useful for achieving improved fuel economy while driving on the highway, where one engine can be left running at "idle" to save fuel while the other engine maintains the vehicle at cruising speeds. Meanwhile additional reserve power is instantly available from the idling engine.

Figure 8:
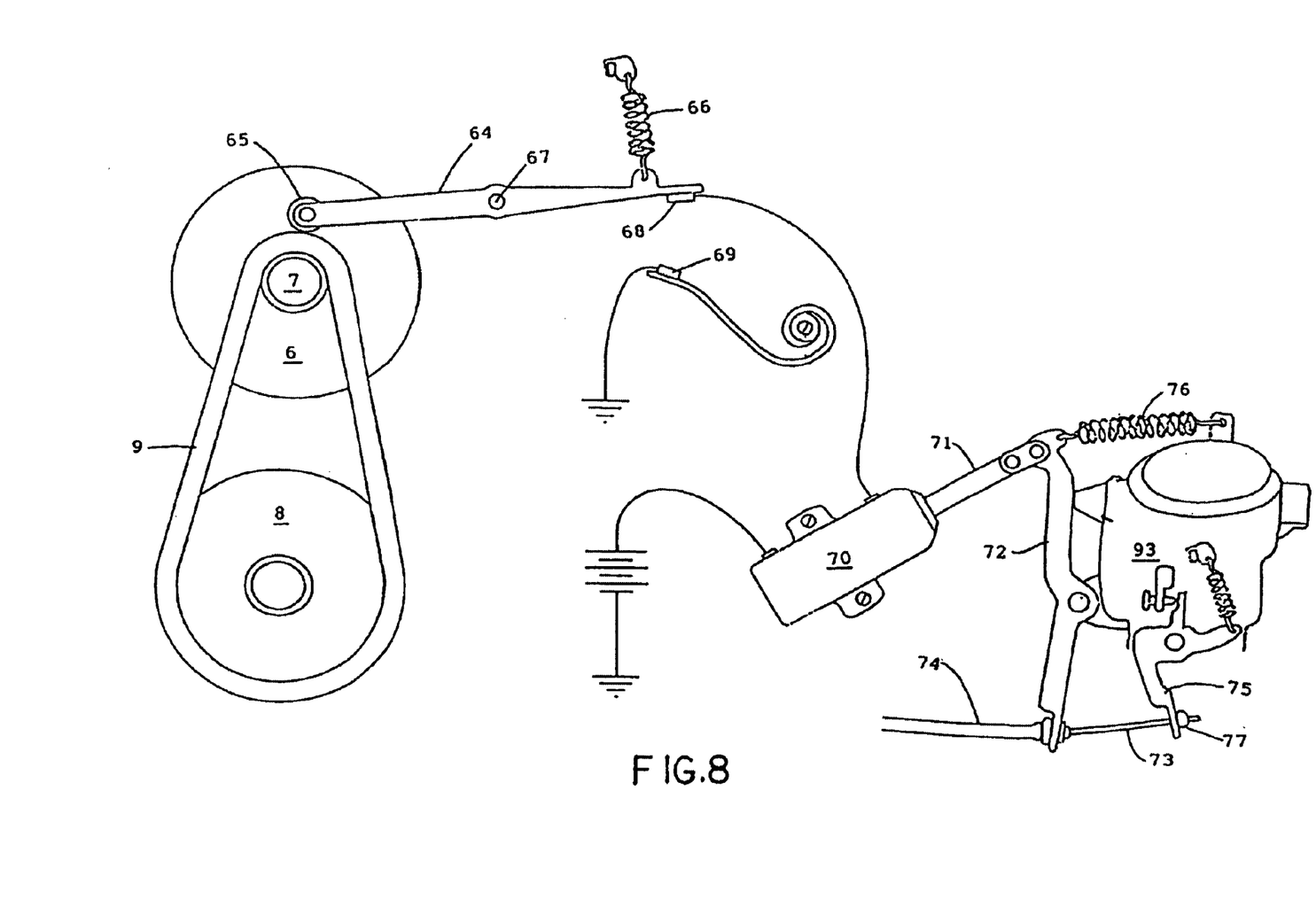
FIG. 8 is a sectional view along line 8–8' of FIG. 7, along with associated lever switch for accommodating a secondary engine, with the primary CVT at "low range."
Figure 9:
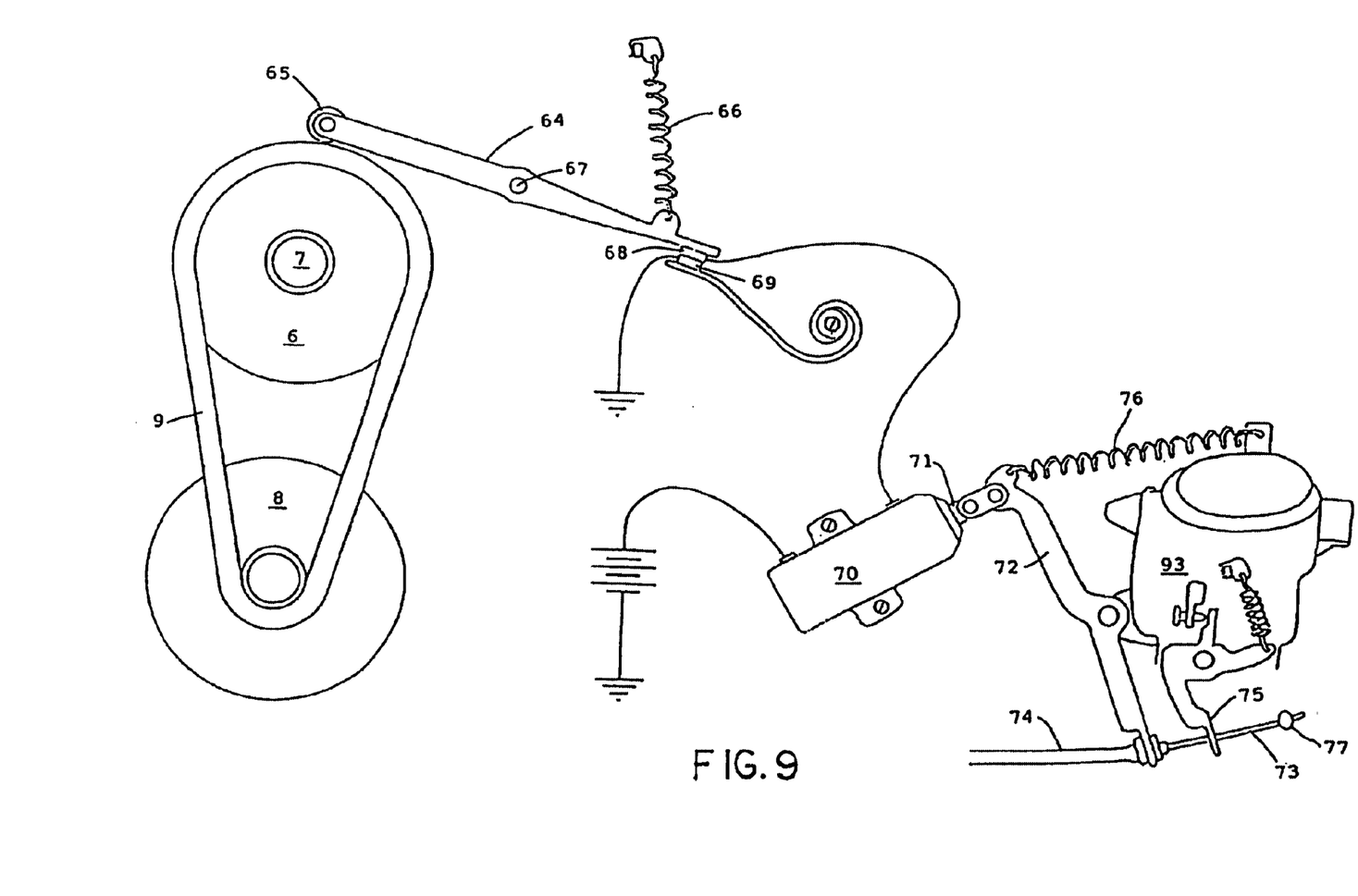
FIG. 9 is the same view as FIG. 8 with the primary CVT at "high range."
Figure 10:
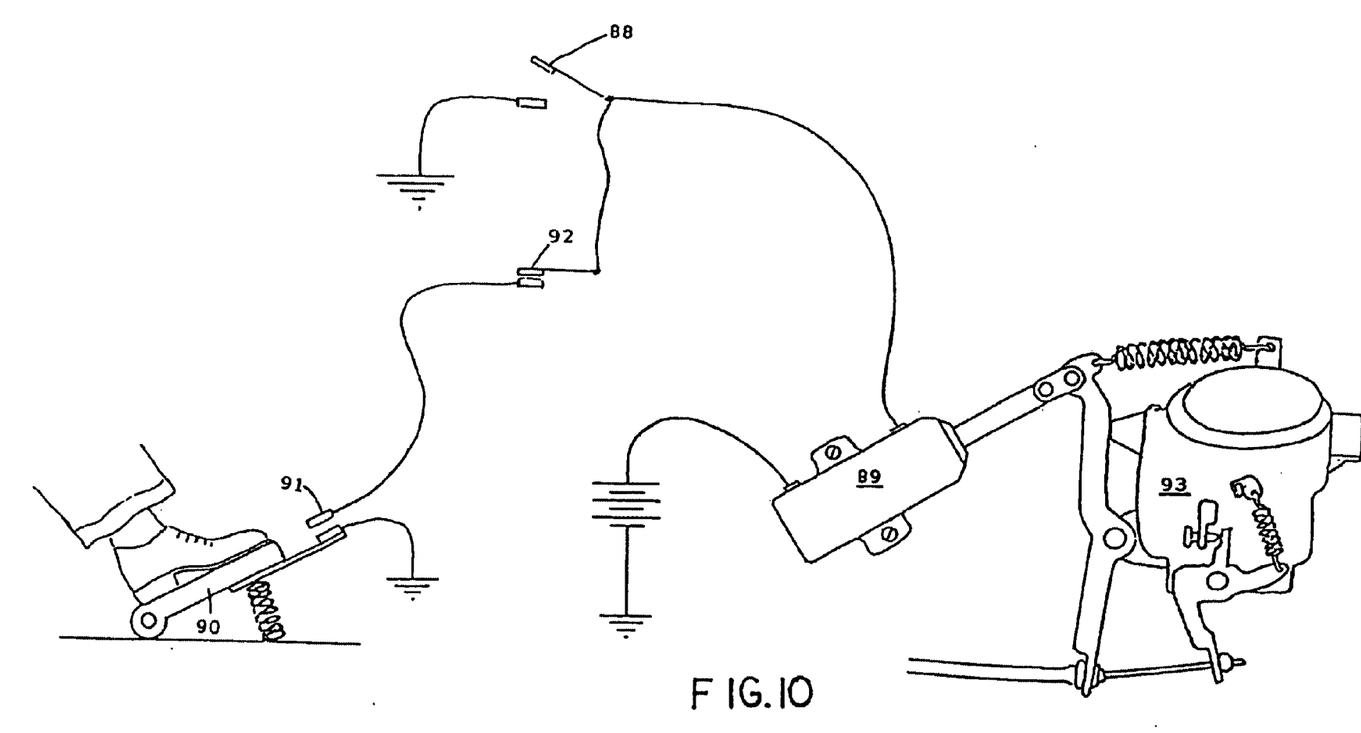
FIG. 10 is a diagrammatic drawing of a switch for manually or automatically controlling the operation of the speed limiter of the secondary engine.

FIGS. 8 and 9 show means for automatic control of the operation of the secondary engine so that it will provide power when needed, and remain disengaged at idle when its power is not needed, without any conscious effort from the operator. The driver may then operate the vehicle like any standard vehicle with a single gas pedal and an automatic transmission.

It will be noted that when the CVT is at low range as in FIG. 8, belt 9 rides close to the hub 7 of drive pulley 6, but when it is at high range belt 9 rides close to the rim of drive pulley 6, as shown in FIG. 9. Using this change in the position of belt 9 relative to drive pulley 6, there is shown switch lever 64 with roller 65 positioned to maintain contact with belt 9 through the action of spring 66. Switch lever 64 pivots on fulcrum 67 to actuate electrical contact points 68 and 69 which are connected to secondary engine speed limiter in the form of a solenoid 70 whose plunger 71 is flexibly attached to lever 72 which controls the position of throttle cable 73 of a secondary engine, as shown. Throttle cable casing 74 is anchored to solenoid lever 72 and is movable towards and away from carburetor throttle lever 75 through the action of solenoid 70, as transmitted by plunger 71 and lever 72.

When the CVT is at low range as shown in FIG. 8 such as when the vehicle is starting, accelerating or climbing a grade, belt 9 rides close to the hub of drive pulley 6, and lever switch points 68 and 69 remain open, as shown, through the action of spring 66. Since no current is flowing through solenoid 70, solenoid plunger 71 remains in the extended position shown in FIG. 8, thus keeping solenoid lever 72 and the attached throttle cable casing 74 in the operational position as well. This position is maintained by the action of solenoid lever spring 76 whose pull is opposed by solenoid 70 when the latter is activated.

Throttle cable 73 passes through a hole in throttle lever 75 beyond which is attached a throttle cable bead 77 to create a slidable connection, so that when solenoid lever 72 and throttle cable casing 74 are in the operational position shown in FIG. 8, throttle lever 75 is controllable through the throttle cable 73, hence through the car's gas pedal.

When the CVT is at "high range," as shown in FIG. 9, such as when the vehicle is at highway cruising speeds, belt 9 rides close to the rim of drive pulley 6 as shown, causing it to close the electrical connection at lever switch points 68 and 69 through switch lever 64. This causes solenoid 70 to pull plunger 71 and solenoid lever 72, thereby moving throttle cable casing 74 closer to throttle lever 75, which takes the bead 77 away from throttle lever 75. This leaves throttle lever 75 in the closed position, so that the secondary engine remains at "idle" speed, and cannot be operated through throttle cable 73 as long as solenoid 70 is switched on.

The foregoing describes how this secondary engine speed limiter means permits simultaneous coordinated operation of both primary and secondary engines for acceleration and climbing grades under the control of one gas pedal and yet it automatically shifts the secondary engine to "idle" speed for improved fuel economy while cruising on a highway, ready to shift it back to regular operation as needed, all without any conscious effort from the driver.

The carburetor 93 shown in FIGS. 8 and 9 is that of the secondary engine. Although the power input sources illustrated in FIGS. 8, 9 and 10 feature internal combustion engines, a hybrid system wherein the primary or secondary power source is an electric motor can be equally accommodated by the apparatus of this invention and, with suitable modifications, by the exemplified speed limiter.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A control apparatus for a vehicle-mounted CVT having a primary output shaft, said control apparatus comprised of:

a) an enclosure comprised of front, rear and top walls bounded by interior and exterior surfaces, b) an input shaft of circular cylindrical surface contour adapted to engage said primary output shaft as an axial extension thereof and rotatively journaled to said front and rear walls, c) low gear and drive gear drive sprocket wheels mounted upon said input shaft in freely rotatable manner and in axially spaced apart relationship, each having, respectively, first and second circular arrays of coupling lobes surrounding said input shaft and axially directed toward said rear wall, d) axially aligned splines disposed within the surface of said input shaft, e) a first gear coupler mounted upon said input shaft so as to be rotatively driven thereby and interactive with said splines so as to be axially slidable upon said shaft, and provided with a third circular array of axially directed coupling lobes adapted to engage said first array of lobes, f) a second gear coupler mounted upon said input shaft so as to be rotatively driven thereby and interactive with said splines so as to be axially slidable upon said shaft, and provided with opposed fourth and fifth circular arrays of axially directed coupling lobes, said fourth array adapted to engage the lobes of said second array, g) a sixth circular array of coupling lobes fixedly associated with said rear wall and adapted to engage the lobes of said fifth array, thereby preventing rotative movement of said input shaft and creating a parking status of said vehicle, h) shifting means for sliding said first and second gear couplers along said input shaft, i) a secondary output shaft journaled to said front and rear walls below said input shaft, and parallel thereto, j) low gear and drive gear driven sprocket wheels fixedly mounted upon said secondary output shaft, and interactive with said low gear and drive gear drive sprocket wheels by way of positive drive means, said low gear driven sprocket wheel being of greater diameter than the corresponding low gear drive sprocket wheel, and said drive gear driven sprocket wheel being of substantially equal diameter with the corresponding drive gear drive sprocket wheel, k) a driven spur gear fixedly mounted upon said secondary output shaft adjacent said rear wall and interactive with a drive spur gear carried by said second gear coupler, said interaction causing said secondary output shaft to rotate oppositely to said output shaft, whereby, l) shifting movement of said first and second gear couplers produces low speed, high speed or reverse rotational movement of said secondary output shaft, or locked securement thereof.

2. The apparatus of claim 1 wherein said positive drive means is a compliant endless member indexed to engage a sprocket wheel.

3. The apparatus of claim 1 wherein said shifting means is comprised of first and second rods secured to said front and rear walls, collars slidably mounted on said rods, and a shift lever extending through said top wall and having a lower extremity adapted to slidably move said collars upon said rods.

4. The apparatus of claim 1 wherein a first CVT unit is interactive with said input shaft through said front wall, and a second CVT unit is interactive with said input shaft through said rear wall.

* * * * *